United States Patent
Belanger (10) Patent No.: US 11,754,115 B1
(45) Date of Patent: Sep. 12, 2023

(54) MULTI-MATERIAL BUSHING FOR ROTATABLY MOUNTING A ROTATING STRUCTURE TO A STATIONARY STRUCTURE

(71) Applicant: Pratt & Whitney Canada Corp., Longueuil (CA)

(72) Inventor: Jean-Francois Belanger, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/722,863

(22) Filed: Apr. 18, 2022

(51) Int. Cl.
   *F16C 17/02* (2006.01)
   *F01D 25/16* (2006.01)
   (Continued)

(52) U.S. Cl.
   CPC ............ *F16C 17/02* (2013.01); *F01D 25/166* (2013.01); *F16C 33/06* (2013.01); *F16C 35/02* (2013.01);
   (Continued)

(58) Field of Classification Search
   CPC .................. F01D 25/162; F01D 25/166; F05D 2300/5021; F05D 2300/50211;
   (Continued)

(56) References Cited

U.S. PATENT DOCUMENTS 4,427,309 A * 1/1984 Blake .................... F01D 25/166
                                                                    417/407

5,538,349 A * 7/1996 Morris .................. F16C 35/077
                                                                    384/537

(Continued)

FOREIGN PATENT DOCUMENTS

DE   102011079677 A1 *  1/2013  .......... F01D 25/162
DE   102016211807 A1 *  1/2018
   (Continued)

OTHER PUBLICATIONS

McHone. Stainless Steel Grades Chart. www.mchoneind.com/stainless-steel-grades-chart/ (Year: 2020).*

(Continued)

*Primary Examiner* — Topaz L. Elliott
(74) *Attorney, Agent, or Firm* — Getz Balich LLC (57) ABSTRACT

An assembly is provided for a gas turbine engine. This assembly includes a rotating structure, a stationary structure and a bushing. The rotating structure extends axially along and is rotatable about a centerline. The stationary structure extends circumferentially about the rotating structure. The stationary structure is configured from or otherwise includes stationary structure material with a coefficient of thermal expansion between 10 μin/in-° F. and 15 μin/in-° F. The bushing is radially between the rotating structure and the stationary structure. The bushing includes a mount and a bearing within the mount. The mount is configured from or otherwise includes mount material with a coefficient of thermal expansion between 9 μin/in-° F. and 10 μin/in-° F. The mount material contacts the stationary structure material. The bearing is configured from or otherwise includes bearing material, where the bearing material is engaged with and rotatably supports the rotating structure. The bearing material is or otherwise includes copper.

20 Claims, 4 Drawing Sheets

(51) Int. Cl.
*F16C 33/06* (2006.01)
*F16C 35/02* (2006.01)

(52) U.S. Cl.
CPC .... *F05D 2240/54* (2013.01); *F05D 2300/121* (2013.01); *F05D 2300/125* (2013.01); *F05D 2300/171* (2013.01); *F05D 2300/1721* (2013.01); *F05D 2300/50212* (2013.01); *F16C 2202/22* (2013.01)

(58) Field of Classification Search
CPC ............ F05D 2300/50212; F16C 17/02; F16C 35/02; F02C 7/06
See application file for complete search history.

(56) References Cited

U.S. PATENT DOCUMENTS

| | | | | |
|---|---|---|---|---|
| 6,010,246 | A | 1/2000 | Gomyo | |
| 6,293,263 | B1* | 9/2001 | Middlebrook | F02B 39/14 123/196 R |
| 7,108,488 | B2* | 9/2006 | Larue | F16C 37/002 384/106 |
| 7,492,548 | B2 | 2/2009 | Asada | |
| 2005/0210875 | A1* | 9/2005 | Larue | F16C 37/002 60/602 |
| 2006/0032225 | A1* | 2/2006 | Dyne | F02B 37/14 60/605.1 |
| 2013/0089418 | A1* | 4/2013 | Boening | F16C 35/02 384/295 |
| 2015/0049967 | A1* | 2/2015 | Fraser | F01D 25/243 384/456 |
| 2015/0056065 | A1* | 2/2015 | Takama | F01D 25/24 415/119 |
| 2017/0310188 | A1* | 10/2017 | Snelick | H02K 5/16 |
| 2019/0368548 | A1* | 12/2019 | Lundsted Poulsen | F04D 29/046 |
| 2021/0310420 | A1* | 10/2021 | Spruce | F02C 6/20 |

FOREIGN PATENT DOCUMENTS

| | | | |
|---|---|---|---|
| JP | H0830492 | B2 * | 3/1996 |
| JP | H08170646 | A * | 3/1997 |
| JP | 2013015033 | A * | 1/2013 |

OTHER PUBLICATIONS

Engineering ToolBox, (2003). Thermal Expansion—Linear Expansion Coefficients. [online] Available at: https://www.engineeringtoolbox.com/linear-expansion-coefficients-d_95.html [Accessed Jan. 5, 2023]. (Year: 2003).*
EuroInox (https://www.worldstainless.org/Files/issf/non-image-files/PDF/Euro_Inox/Tables_TechnicalProperties_EN.pdf (Year: 2007).*
Kad. S.S. 200 vs S.S. 304 [online] Available at: http://www.kadindia.com/ss200vsss304.html [Accessed Jan. 5, 2023] (Year: 2006).*

* cited by examiner

MULTI-MATERIAL BUSHING FOR ROTATABLY MOUNTING A ROTATING STRUCTURE TO A STATIONARY STRUCTURE

TECHNICAL FIELD

This disclosure relates generally to a gas turbine engine and, more particularly, to a bushing for the gas turbine engine.

BACKGROUND INFORMATION

A gas turbine engine may include a shaft rotatably mounted to a housing by a bushing. The shaft may rotate within the bushing such that the shaft and the bushing form a journal bearing. Various types and configurations of journal bearing bushings are known in the art. While these known journal bearing bushings have various benefits, there is still room in the art for improvement. There is a need in the art therefore for an improved bushing for rotatably mounting a rotating structure such as a shaft to a stationary structure such as a housing.

SUMMARY

According to an aspect of the present disclosure, an assembly is provided for a gas turbine engine. This assembly includes a rotating structure, a stationary structure and a bushing. The rotating structure extends axially along and is rotatable about a centerline. The stationary structure extends circumferentially about the rotating structure. The stationary structure is configured from or otherwise includes stationary structure material with a coefficient of thermal expansion between 10 $\mu$in/in-° F. and 15 $\mu$in/in-° F. The bushing is radially between the rotating structure and the stationary structure. The bushing includes a mount and a bearing within the mount. The mount is configured from or otherwise includes mount material with a coefficient of thermal expansion between 9 $\mu$in/in-° F. and 10 $\mu$in/in-° F. The mount material contacts the stationary structure material. The bearing is configured from or otherwise includes bearing material, where the bearing material is engaged with and rotatably supports the rotating structure. The bearing material is or otherwise includes copper.

According to another aspect of the present disclosure, another assembly is provided for a gas turbine engine. This assembly includes a rotating structure, a stationary structure and a bushing. The rotating structure extends axially along and is rotatable about a centerline. The stationary structure circumscribes the rotating structure. The stationary structure is configured from or otherwise includes at least one of the aluminum or the magnesium. The bushing rotatably couples the rotating structure to the stationary structure. The bushing includes a mount and a bearing within the mount. The mount is configured from or otherwise includes stainless steel, where the stainless steel contacts the at least one of the aluminum or the magnesium. The bearing is configured from or otherwise includes leaded bronze, where the leaded bronze is engaged with and rotatably supports the rotating structure.

According to still another aspect of the present disclosure, another assembly is provided for a gas turbine engine. This assembly includes a rotating structure, a stationary structure and a bushing. The rotating structure extends axially along and is rotatable about a centerline. The stationary structure circumscribes the rotating structure. The stationary structure is configured from or otherwise includes stationary structure material. The stationary structure material is or otherwise includes at least one of aluminum or magnesium. The bushing rotatably couples the rotating structure to the stationary structure. The bushing includes a mount and a bearing within the mount. The mount is configured from or otherwise includes mount material, where the mount material contacts the stationary structure material. The bearing is configured from or otherwise includes bronze, where the bronze is engaged with and rotatably supports the rotating structure. The mount material is or otherwise includes at least one of 200 series stainless steel or 300 series stainless steel.

The leaded bronze may contact the stainless steel.

The bushing may also include a sleeve radially between the mount and the bearing. The sleeve may be configured from or otherwise include plain carbon steel contacting the stainless steel and the leaded bronze.

The mount may include a base and a flange. The base may be mated with an aperture of the stationary structure. The flange may project radially out from the base and may axially engage the stationary structure.

The stationary structure material may be or otherwise include aluminum.

The stationary structure material may be or otherwise include magnesium.

The mount material may be or otherwise include stainless steel.

The stainless steel may be or otherwise include 200 series stainless steel.

The stainless steel may be or otherwise include one of: 201 stainless steel; 203 stainless steel; 204 stainless steel; 209 stainless steel; 214 stainless steel; 216 stainless steel; 218 stainless steel; or 240 stainless steel.

The stainless steel may be or otherwise include 300 series stainless steel.

The stainless steel may be or otherwise include one of: 302 stainless steel; 303 stainless steel; 304 stainless steel; 310 stainless steel; 316 stainless steel; 321 stainless steel; or 347 stainless steel.

The bearing material may be configured from or otherwise include bronze, where the bronze includes the copper.

The bronze may be or otherwise include leaded bronze.

The bearing material may contact the mount material.

The bushing may also include a sleeve radially between the mount and the bearing. The sleeve may be configured from or otherwise include sleeve material with a coefficient of thermal expansion between 6 $\mu$in/in-° F. and 7 $\mu$in/in-° F. The sleeve material may contact the mount material and the bearing material.

The mount may include a base and a flange. The base may be disposed within an aperture of the stationary structure and may radially contact the stationary structure. The flange may project radially out from the base and may axially engage the stationary structure.

The rotating structure may be configured as or otherwise include a shaft.

The rotating structure may be configured as or otherwise include a gear.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
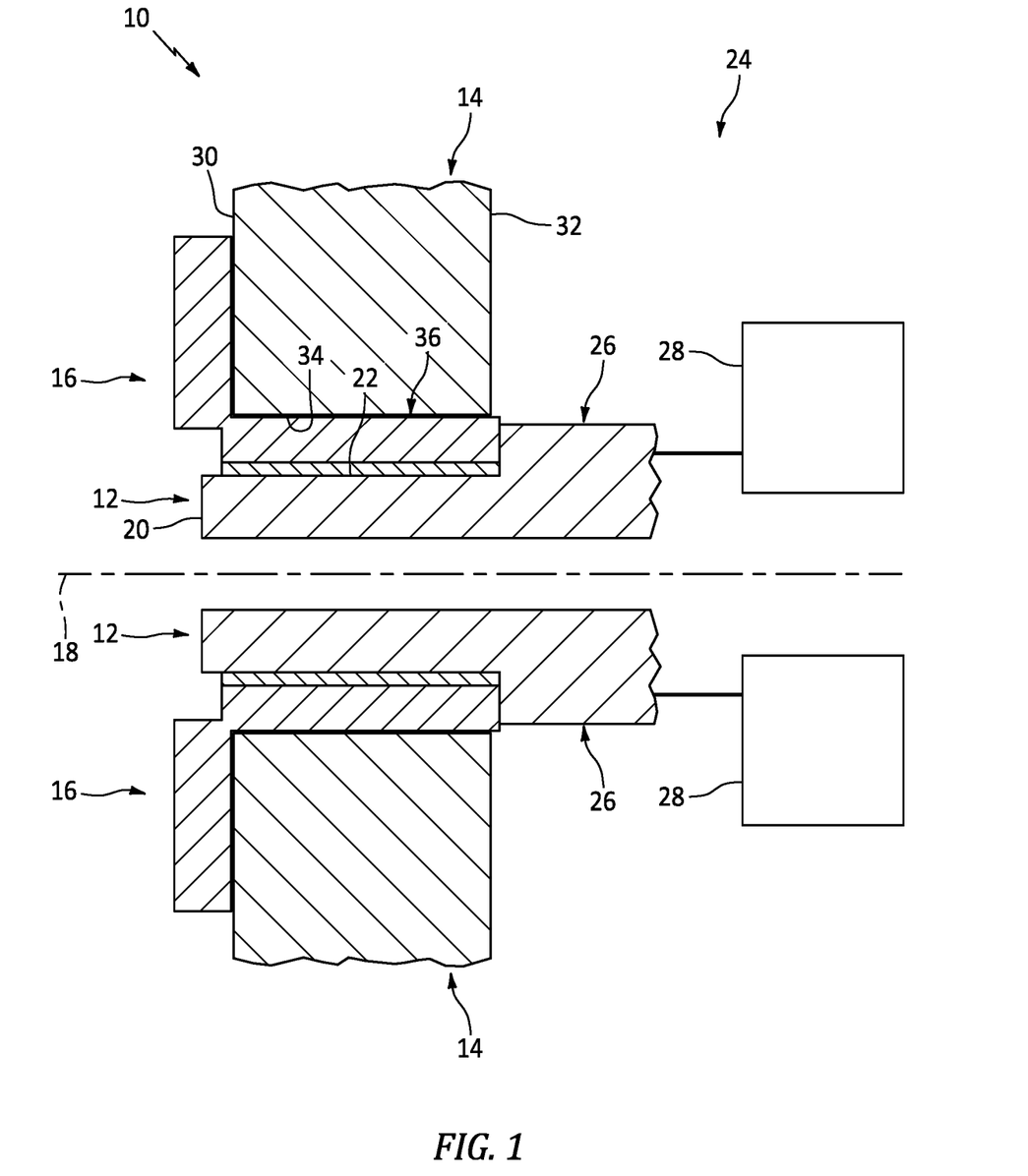
FIG. 1 is a partial side sectional illustration of an assembly for a gas turbine engine.

FIG. 1 illustrates an assembly 10 for a gas turbine engine. This gas turbine engine may be included within an aircraft propulsion system. The gas turbine engine, for example, may be configured as a turbofan gas turbine engine, a turboshaft gas turbine engine, a turboprop gas turbine engine or a turboshaft gas turbine engine. The gas turbine engine may alternatively be included within a power generation system. The gas turbine engine, for example, may be configured as an auxiliary power unit (APU) or an industrial gas turbine engine. The engine assembly 10 of the present disclosure, however, is not limited to any particular gas turbine engine type or configuration.

The engine assembly 10 of FIG. 1 includes a rotating structure 12 and a stationary structure 14. This engine assembly 10 also includes a multi-section/multi-material bushing 16 (e.g., a journal bearing bushing) rotatably mounting the rotating structure 12 to the stationary structure 14.

The rotating structure 12 extends axially along an axial centerline 18 to an axial end 20 of the rotating structure 12. The rotating structure 12 extends circumferentially about (e.g., completely around) the axial centerline 18. The rotating structure 12 extends radially outward (e.g., away from the axial centerline 18) to a radial outer side 22 of the rotating structure 12.

The rotating structure 12 is rotatable about the axial centerline 18; e.g., a rotational axis. This rotating structure 12 may be configured as a rotor for an apparatus within the gas turbine engine such as a geartrain 24. The rotating structure 12 of FIG. 1, for example, includes a shaft 26 and another rotating element 28 such as a gear. The rotating element 28 is connected to (e.g., formed integral with or otherwise attached to) and rotatable with the shaft 26. The shaft 26 of FIG. 1 projects axially out from and/or away from the rotating element 28 along the axial centerline 18 to the rotating structure end 20. The shaft 26 of FIG. 1 also projects radially out to the rotating structure outer side 22. The present disclosure, however, is not limited to such an exemplary rotating structure configuration. The rotating structure 12, for example, may alternatively be configured as or otherwise include a sleeve or another component mounted on or otherwise connected to the shaft 26 and/or the rotating element 28. Furthermore, the present disclosure is not limited to geartrain applications. The rotating structure 12, for example, may also or alternatively include or be rotatably coupled to various other rotating components within the gas turbine engine besides a gear; e.g., a bladed rotor, etc.

The rotating structure 12 is constructed from or otherwise includes rotating structure material. This rotating structure material is a metal such as a high strength, low alloy steel; e.g., AISI 9310, AISI 4340 and AISI 17-22A. The rotating structure material may be selected to have a coefficient of thermal expansion between 6.5 μin/in-° F. (~11.7 μm/m-° C.) and 7.0 μin/in-° F. (~12.6 μm/m-° C.); e.g., 6.9 μin/in-° F. (~12.42 μm/m-° C.) for AISI 9310, 6.5 μin/in-° F. (~11.7 μm/m-° C.) for AISI 4340, or 7.0 μin/in-° F. (~12.6 μm/m-° C.) for AISI 17-22A. The coefficient of thermal expansion may be measured at 400° F.

The stationary structure 14 extends axially along the axial centerline 18 between and to an axial first side 30 of the stationary structure 14 and an axial second side 32 of the stationary structure 14. The stationary structure 14 extends circumferentially about (e.g., completely around) the axial centerline 18. The stationary structure 14 extends radially inwards (e.g., towards the axial centerline 18) to a radial inner side 34 of the stationary structure 14. This stationary structure inner side 34 forms an aperture 36 (e.g., a bore) within the stationary structure 14. The stationary structure aperture 36 of FIG. 1 extends axially through the stationary structure 14 between the stationary structure first side 30 and the stationary structure second side 32. This stationary structure aperture 36 receives the rotating structure 12. The rotating structure 12 of FIG. 1 and its shaft 26, for example, project axially along the axial centerline 18 into (e.g., through) the stationary structure aperture 36. The stationary structure 14 of FIG. 1 may thereby circumscribe the rotating structure 12 and its shaft 26.

The stationary structure 14 is configured as a support for the rotating structure 12 and the bushing 16. The stationary structure 14 may also be configured as a housing for the rotating structure 12 and/or one or more the other components of the engine assembly 10. The stationary structure 14, for example, may be configured as a geartrain housing with a leg or wall that supports the rotating structure 12 through the bushing 16 as described below. The present disclosure, however, is not limited to such an exemplary stationary structure configuration.

The stationary structure 14 is constructed from or otherwise includes stationary structure material. This stationary structure material is a high thermal expansion and/or lightweight metal such as aluminum (Al), magnesium (Mg), and/or an alloy thereof. The stationary structure material is selected to have a coefficient of thermal expansion between 10 μin/in-° F. (~18 μm/m-° C.) and 15 μin/in-° F. (~27 μm/m-° C.); e.g., between 10 μin/in-° F. (~18 μm/m-° C.) and 12 μin/in-° F. (~21.6 μm/m-° C.), between 12 μin/in-° F. (~21.6 μm/m-° C.) and 13 μin/in-° F. (~23.4 μm/m-° C.), between 13 μin/in-° F. (~23.4 μm/m-° C.) and 15 μin/in-° F. (~27 μm/m-° C.), etc. For example, the aluminum stationary structure material may be cast C355/355 (13 μin/in-° F.), A357/F357 (12.6 μin/in-° F.) or A356/356 (12.5 μin/in-° F.). The magnesium stationary structure material may be cast ZE41A (15.1 μin/in-° F.), WE43A (15.6 μin/in-° F.) or EV31A (14 μin/in-° F.). The coefficient of thermal expansion may be measured at 400° F.

Figure 2:
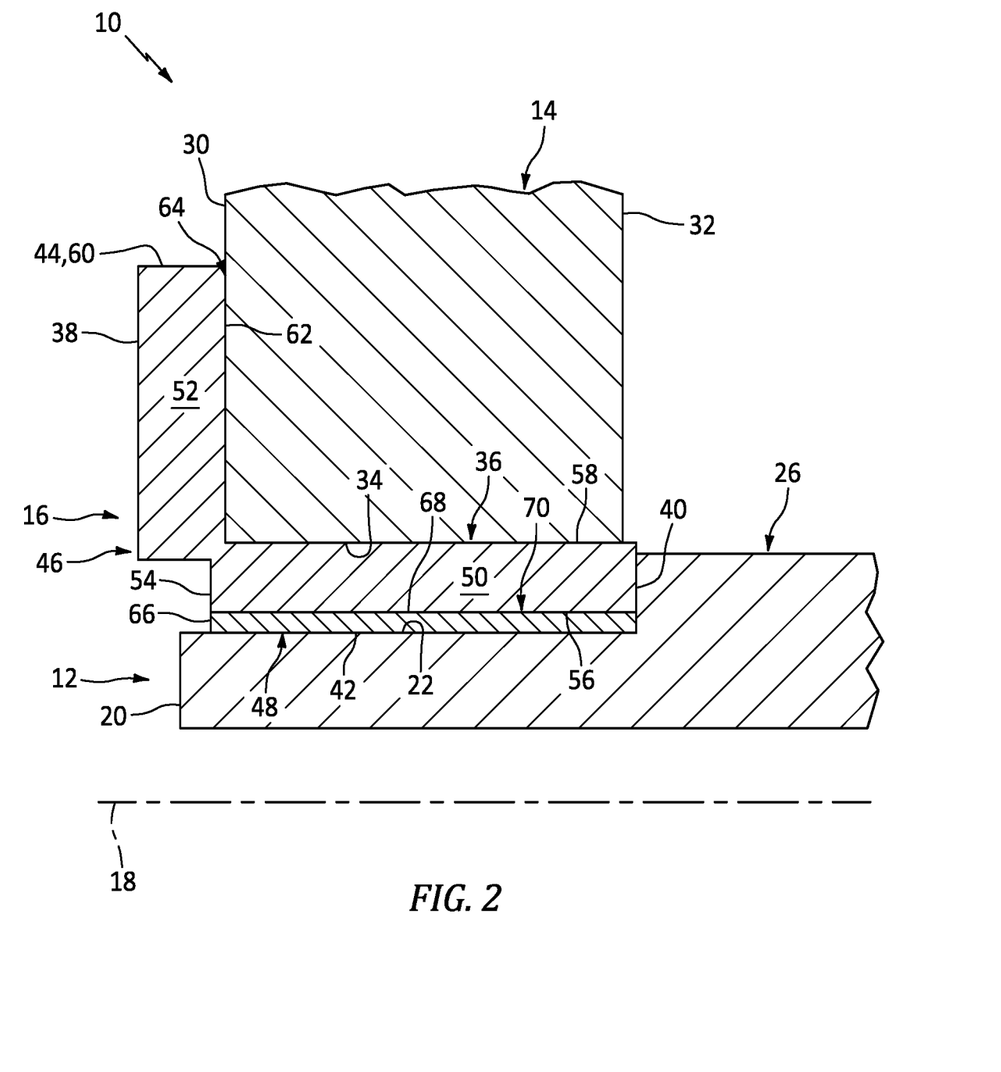
FIG. 2 is a partial side sectional illustration of a rotating assembly rotatably mounted to a stationary structure through a bushing.

Referring to FIG. 2, the bushing 16 extends axially along the axial centerline 18 between and to an axial first side 38 of the bushing 16 and an axial second side 40 of the bushing 16. The bushing 16 extends circumferentially about (e.g., completely around) the axial centerline 18; e.g., providing the bushing 16 with an annular body. The bushing 16 extends radially between and to a radial inner side 42 of the bushing 16 and a radial outer side 44 of the bushing 16. The bushing 16 of FIG. 2 includes a bushing mount 46 and a bushing bearing 48.

The mount 46 of FIG. 2 includes a mount base 50 and a mount flange 52; e.g., an annular rim. The base 50 extends axially along the axial centerline 18 between and to an axial first side 54 of the base 50 and the bushing second side 40, where the base first side 54 may be recessed axially inward from the bushing first side 38. The base 50 extends circumferentially about (e.g., completely around) the axial centerline 18. The base 50 extends radially between and to a radial inner side 56 of the mount 46 and a radial outer side 58 of the base 50. The flange 52 is connected to (e.g., formed integral with or otherwise attached to) the base 50 at (e.g., on, adjacent or proximate) the bushing first side 38. The flange 52 of FIG. 2 projects radially out from the base 50 and its base outer side 58 to a radial distal end 60 of the flange 52; here, the bushing outer side 44. The flange 52 extends circumferentially about (e.g., completely around) the axial centerline 18. The flange 52 extends axially along the axial centerline 18 and the base 50 between and to the bushing first side 38 and an axial second side 62 of the flange 52, where the flange second side 62 is recessed axially inward from the bushing second side 40.

The base 50 and the flange 52 of FIG. 2 are configured to provide the mount 46 with a receptacle 64; e.g., an annular notch or groove. This receptacle 64 projects axially into the bushing 16 from the bushing second side 40 to the flange second side 62. The receptacle 64 projects radially inward into the bushing 16 from the bushing outer side 44 to the base outer side 58. The receptacle 64 also extends circumferentially about (e.g., completely around) the axial centerline 18.

The mount 46 is constructed from or otherwise includes mount material. This mount material is a high thermal expansion metal such as stainless steel (ss). This stainless steel may be 200 series stainless steel such as, but not limited to: 201 stainless steel; 203 stainless steel; 204 stainless steel; 209 stainless steel; 214 stainless steel; 216 stainless steel; 218 stainless steel; or 240 stainless steel. The stainless steel may alternatively be 300 stainless steel such as, but not limited to: 302 stainless steel; 303 stainless steel; 304 stainless steel; 310 stainless steel; 316 stainless steel; 321 stainless steel; or 347 stainless steel. The mount material is selected to have a coefficient of thermal expansion between 9 μin/in-° F. (~16.2 μm/m-° C.) and 10 μin/in-° F. (~18 μm/m-° C.); e.g., between 9 μin/in-° F. (~16.2 μm/m-° C.) and 9.5 μin/in-° F. (~17.1 μm/m-° C.), between 9.5 μin/in-° F. (~17.1 μm/m-° C.) and 10 μin/in-° F. (~18 μm/m-° C.), etc. The coefficient of thermal expansion may be measured at 400° F.

The bearing 48 extends axially along the axial centerline 18 between and to an axial first side 66 of the bearing 48 and the bushing second side 40, where the bearing first side 66 may be recessed axially inward from the bushing first side 38 and/or axially aligned with the base first side 54. The bearing 48 extends circumferentially about (e.g., completely around) the axial centerline 18. The bearing 48 extends radially between and to the bushing inner side 42 and a radial outer side 68 of the bearing 48.

The bearing 48 is constructed from or otherwise includes bearing material. This bearing material is a high strength, low friction metal that includes copper; e.g., a copper alloy. The bearing material, for example, may be bronze such as, but not limited to, leaded bronze. The bearing material may have a coefficient of thermal expansion between 10.5 μin/in-° F. (~18.9 μm/m-° C.) and 11.5 μin/in-° F. (~20.7 μm/m-° C.); e.g., 10.9 μin/in-° F. (~19.62 μm/m-° C.). The coefficient of thermal expansion may be measured at 400° F.

The bearing 48 is disposed within an aperture 70 (e.g., a bore) of the mount 46 and its base 50. The bearing 48 of FIG. 2, for example, axially and/or circumferentially overlaps (e.g., covers, coats, etc.) and is attached (e.g., bonded, etc.) to an (e.g., cylindrical) inner surface of the mount 46 at the base inner side 56. The bushing 16 is disposed within the stationary structure aperture 36. The base 50 of FIG. 1, for example, is received within (e.g., projects axially into) the stationary structure aperture 36. The flange 52 is connected (e.g., fastened via one or more fasteners) to the stationary structure 14 to fix the bushing 16 and its mount 46 to the stationary structure 14. The base 50 and its outer side 58 are abutted radially against the stationary structure 14 and its inner side 34. The flange 52 and its second side 62 are abutted axially against the stationary structure 14 and its first side 30. The mount 46 and its mount material may thereby radially and/or axially contact the stationary structure 14 and its stationary structure material. With this arrangement, the mount material provides a material bridge/buffer between the bearing material and the stationary structure material. The mount material, for example, is configured to accommodate/bridge the different material properties (e.g., coefficients of thermal expansion, bonding properties, etc.) of the bearing material and the stationary structure material.

In addition to providing a material property bridge, the mount material may be selected such that the bearing material may be bonded (e.g., applied) to the mount material without degrading material properties of the mount material. For example, the mount material may be a non-hardenable stainless steel (e.g., the above disclosed 200 or 300 series stainless steels) such that heat used during the bonding and/or application of the bearing material to the mount material will not degrade or undo previous hardening of the mount material. More particularly, the mount material may be selected such that the mount material does not need to be hardened via heat treatment prior to receiving the bearing material.

The bushing 16 extends circumferentially about (e.g., completely around) the rotating structure 12 and its shaft 26; see also FIG. 1. More particularly, the bearing 48 circumscribes the rotating structure 12 and its shaft 26. An (e.g., cylindrical) inner surface of the bearing 48 at the bushing inner side 42 faces, radially abuts and radially engages (e.g., through an oil film and/or contacts) an (e.g., cylindrical) outer surface of the shaft 26 at the rotating structural outer side 22. The bushing 16 and its bearing 38 may thereby rotatably support the rotating structure 12 and its shaft 26 within/relative to the stationary structure 14.

Figure 3:
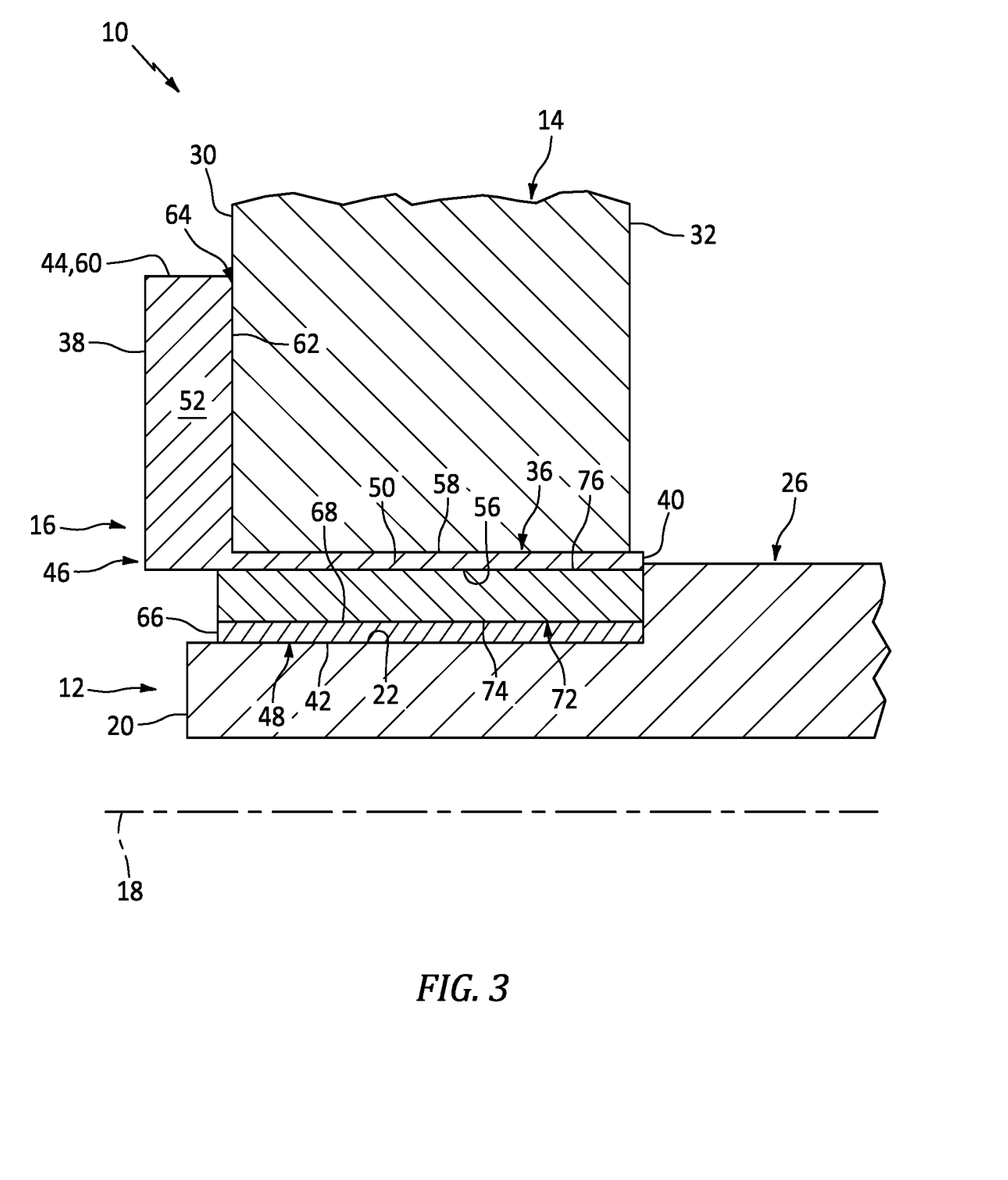
FIG. 3 is a partial side sectional illustration of the rotating assembly rotatably mounted to the stationary structure through another bushing.

In some embodiments, referring to FIG. 3, the bushing 16 may include one or more intermediate elements between the mount 46 and the bearing 48. The bushing 16 of FIG. 3, for example, also includes an intermediate sleeve 72 radially between the base 50 and the bearing 48. This sleeve 72 extends radially between and to a radial inner side 74 of the sleeve 72 and a radial outer side 76 of the sleeve 72. The sleeve outer side 76 may radially abut against the mount inner side 56. The sleeve inner side 74 may radially abut against the bearing outer side 68. Thus, material forming the sleeve 72 may radially contact the mount material and/or the bearing material.

The sleeve material is selected to provide an additional material property bridge between the bearing material and the mount material. The sleeve material, for example, may be a low thermal expansion metal such as, but not limited to, plain carbon steel. The sleeve material is selected to have a coefficient of thermal expansion between 6 μin/in-° F. (~10.8 μm/m-° C.) and 7 μin/in-° F. (~12.6 μm/m-° C.). Inclusion of such a sleeve may be particularly useful where, for example, the mount material is a hardened stainless steel such as, but not limited to, hardened 286 stainless steel. The bearing material, for example, may be bonded and/or otherwise applied to the sleeve material. This coated sleeve may then be mounted (e.g., press fit or otherwise attached) to the mount 46 and its base 50 without, for example, affecting a hardness of the mount material.

Figure 4:
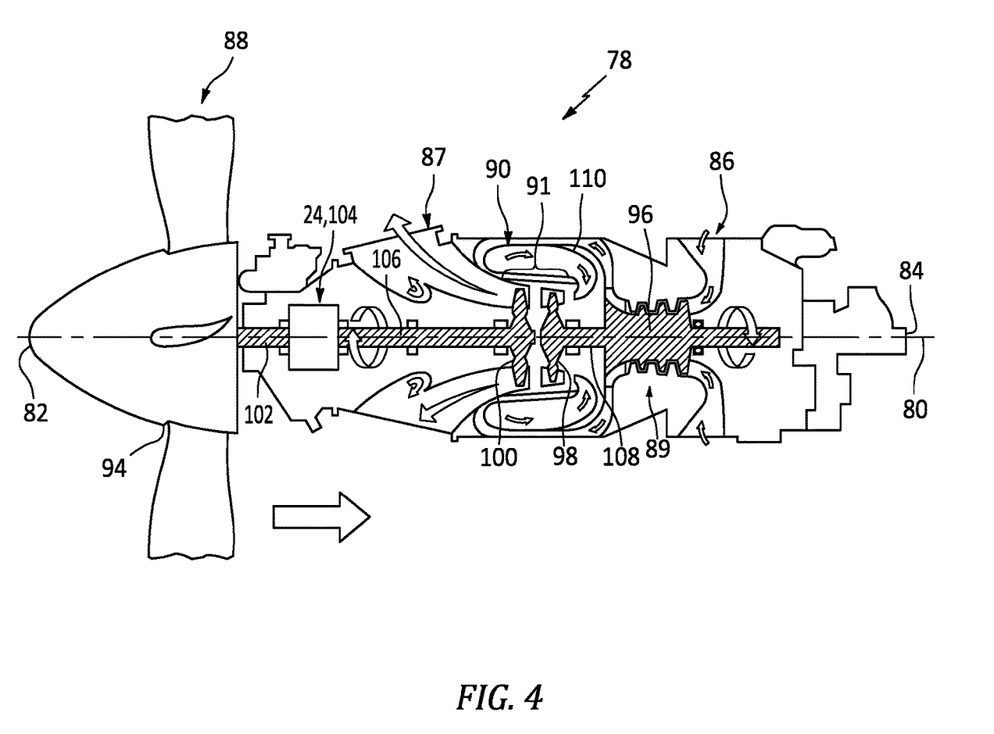
FIG. 4 is a side schematic illustration of a gas turbine engine with which the engine assembly may be included.

FIG. 4 illustrates an example of the gas turbine engine with which the engine assembly 10 may be configured. This gas turbine engine is configured as a turboprop gas turbine engine 78. This gas turbine engine 78 of FIG. 4 extends axially along a rotational axis 80 of the gas turbine engine 78 between a forward end 82 of the gas turbine engine 78 and an aft end 84 of the gas turbine engine 78; which rotational axis 80 may be the same or different than the axial centerline 18; see FIG. 1. The gas turbine engine 78 of FIG. 4 includes an airflow inlet 86, a combustion product exhaust 87, a propulsor (e.g., a propeller) section 88, a compressor section 89, a combustor section 90 and a turbine section 91.

The airflow inlet 86 is towards the engine aft end 84, and aft of the turbine engine sections 88-91. The exhaust 87 is located towards the engine forward end 82, and axially between propulsor section 88 and the turbine engine sections 89-91.

The propulsor section 88 includes a propulsor rotor 94; e.g., a propeller. The compressor section 89 includes a compressor rotor 96. The turbine section 91 includes a high pressure turbine (HPT) rotor 98 and a low pressure turbine (LPT) rotor 100, where the LPT rotor 100 may be referred to as a power turbine rotor and/or a free turbine rotor. Each of these turbine engine rotors 94, 96, 98 and 100 includes a plurality of rotor blades arranged circumferentially about and connected to one or more respective rotor disks or hubs.

The propulsor rotor 94 of FIG. 4 is connected to the LPT rotor 100 sequentially through a propulsor shaft 102, an epicyclic geartrain 104 (e.g., the geartrain 24) and a low speed shaft 106. The compressor rotor 96 is connected to the HPT rotor 98 through a high speed shaft 108.

During gas turbine engine operation, air enters the gas turbine engine 78 through the airflow inlet 86. This air is directed into a core flowpath which extends sequentially through the engine sections 89-91 (e.g., an engine core) to the exhaust 87. The air within this core flowpath may be referred to as "core air".

The core air is compressed by the compressor rotor 96 and directed into a combustion chamber of a combustor 110 in the combustor section 90. Fuel is injected into the combustion chamber and mixed with the compressed core air to provide a fuel-air mixture. This fuel-air mixture is ignited and combustion products thereof flow through and sequentially cause the HPT rotor 98 and the LPT rotor 100 to rotate. The rotation of the HPT rotor 98 drives rotation of the compressor rotor 96 and, thus, compression of air received from the airflow inlet 86. The rotation of the LPT rotor 100 drives rotation of the propulsor rotor 94, which propels air outside of the gas turbine engine 78 in an aft direction to provide forward thrust. The present disclosure, however, is not limited to any particular types or configurations of gas turbine engines as stated above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
   a rotating structure extending axially along and rotatable about a centerline;
   a stationary structure extending circumferentially about the rotating structure, the stationary structure comprising stationary structure material with a coefficient of thermal expansion between 10 μin/in-° F. and 15 μin/in-° F.; and
   a bushing radially between the rotating structure and the stationary structure, the bushing including a mount and a bearing within the mount, the mount comprising mount material with a coefficient of thermal expansion between 9 μin/in-° F. and 10 μin/in-° F., the mount material contacting the stationary structure material, the bearing comprising bearing material engaged with and rotatably supporting the rotating structure, and the bearing material comprising copper;
   wherein the bushing further includes a sleeve radially between the mount and the bearing;
   wherein the sleeve comprises sleeve material with a coefficient of thermal expansion between 6 μin/in-° F. and 7 μin/in-° F.; and
   wherein the sleeve material contacts the mount material and the bearing material.

2. The assembly of claim 1, wherein the stationary structure material comprises aluminum.

3. The assembly of claim 1, wherein the stationary structure material comprises magnesium.

4. The assembly of claim 1, wherein the mount material comprises stainless steel.

5. The assembly of claim 4, wherein the stainless steel is 200 series stainless steel.

6. The assembly of claim 4, wherein the stainless steel comprises one of:
   201 stainless steel;
   203 stainless steel;
   204 stainless steel;
   209 stainless steel;
   214 stainless steel;
   216 stainless steel;
   218 stainless steel; or
   240 stainless steel.

7. The assembly of claim 4, wherein the stainless steel is 300 series stainless steel.

8. The assembly of claim 4, wherein the stainless steel comprises one of:
   302 stainless steel;
   303 stainless steel;
   304 stainless steel;
   310 stainless steel;
   316 stainless steel;
   321 stainless steel; or
   347 stainless steel.

9. The assembly of claim 1, wherein
   the bearing material comprises bronze; and
   the bronze comprises the copper.

10. The assembly of claim 9, wherein the bronze comprises leaded bronze.

11. The assembly of claim 1, wherein
   the mount includes a base and a flange;
   the base is disposed within an aperture of the stationary structure and radially contacts the stationary structure; and
   the flange projects radially out from the base and axially engages the stationary structure.

12. The assembly of claim 1, wherein the rotating structure comprises a shaft.

13. The assembly of claim 1, wherein the rotating structure comprises a gear.

14. An assembly for a gas turbine engine, comprising:
a rotating structure extending axially along and rotatable about a centerline;
a stationary structure extending circumferentially about the rotating structure, the stationary structure comprising stationary structure material with a coefficient of thermal expansion between 10 μin/in-° F. and 15 μin/in-° F.; and
a bushing radially between the rotating structure and the stationary structure, the bushing including a mount and a bearing within the mount, the mount comprising mount material with a coefficient of thermal expansion between 9 μin/in-° F. and 10 μin/in-° F., the mount material contacting the stationary structure material, the bearing comprising bearing material engaged with and rotatably supporting the rotating structure, and the bearing material comprising copper;
wherein the bearing material contacts and is bonded to the mount material.

15. The assembly of claim 14, wherein the stationary structure material comprises aluminum or magnesium.

16. The assembly of claim 14, wherein the mount material comprises stainless steel.

17. The assembly of claim 14, wherein
the bearing material comprises bronze; and
the bronze comprises the copper.

18. The assembly of claim 14, wherein
the mount includes a base and a flange;
the base is disposed within an aperture of the stationary structure and radially contacts the stationary structure; and
the flange projects radially out from the base and axially engages the stationary structure.

19. An assembly for a gas turbine engine, comprising:
a rotating structure extending axially along and rotatable about a centerline;
a stationary structure circumscribing the rotating structure, the stationary structure comprising at least one of aluminum or magnesium; and
a bushing rotatably coupling the rotating structure to the stationary structure, the bushing including a mount and a bearing within the mount, the mount comprising stainless steel that contacts the at least one of the aluminum or the magnesium, and the bearing comprising leaded bronze that is engaged with and rotatably supports the rotating structure;
wherein the bushing further includes a sleeve radially between the mount and the bearing; and
wherein the sleeve comprises plain carbon steel contacting the stainless steel and the leaded bronze.

20. The assembly of claim 19, wherein
the mount includes a base and a flange;
the base is mated with an aperture of the stationary structure; and
the flange projects radially out from the base and axially engages the stationary structure.

\* \* \* \* \*